G. J. STARMANNS.
STREET SPRINKLER.
APPLICATION FILED FEB. 14, 1918.

1,290,393.

Patented Jan. 7, 1919.
2 SHEETS—SHEET 1.

Inventor:
Gustav J. Starmanns,
By Hugh H. Wagner
His attorney

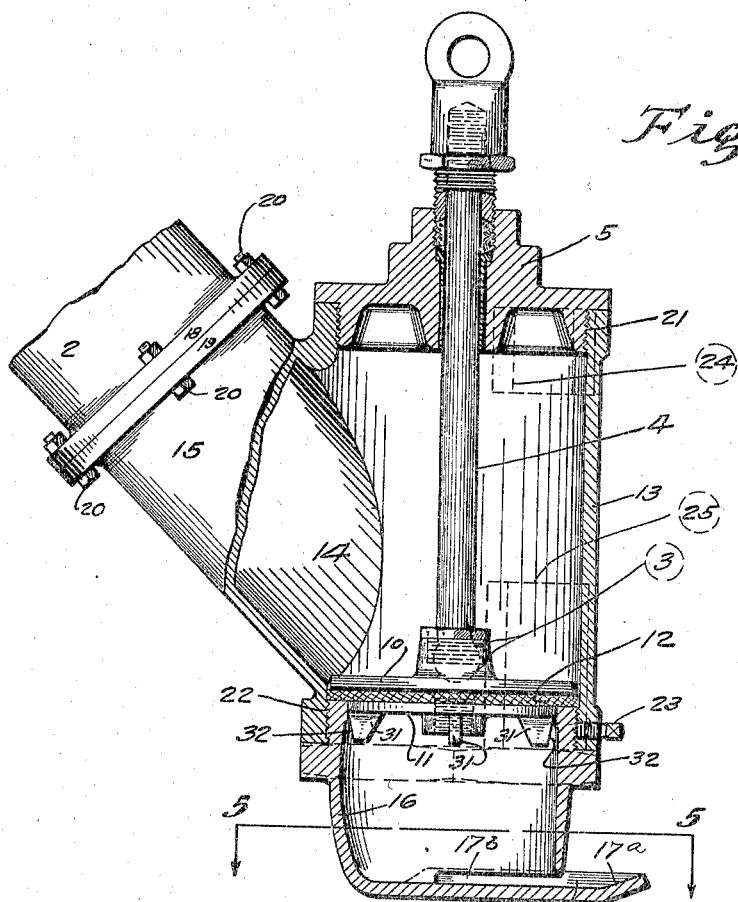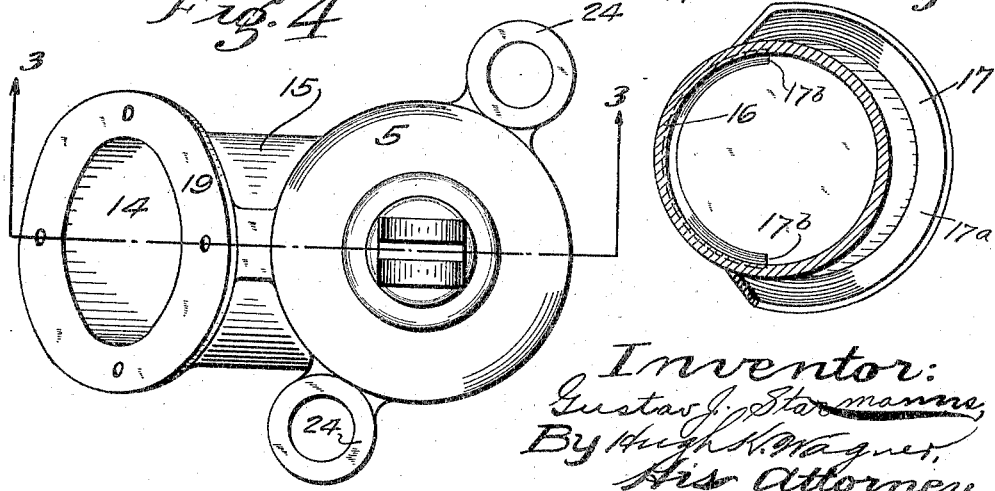

UNITED STATES PATENT OFFICE.

GUSTAV J. STARMANNS, OF ST. LOUIS, MISSOURI.

STREET-SPRINKLER.

1,290,393. Specification of Letters Patent. Patented Jan. 7, 1919.

Application filed February 14, 1918. Serial No. 217,214.

*To all whom it may concern:*

Be it known that I, GUSTAV J. STARMANNS, a citizen of the United States, residing at the city of St. Louis, in the State of Missouri, have invented certain new and useful Improvements in Street-Sprinklers, of which the following is a specification.

This invention is a valve and its connections for a motor-driven street sprinkling cart or truck. On account of the rapid movement of a motor-driven apparatus of this kind as distinguished from a horse-drawn vehicle of the same nature, it is desirable and even necessary that the approach to the outlet for the water shall be as free as possible from obstruction or anything that tends to diminish the force of its flow outwardly through the sprinkler or sprinklers. This is particularly true where reliance is placed on the natural head of the water for the force of its flow rather than upon compressed air or mechanical means.

In the present apparatus it will be observed that this force of flow of the water toward and through the sprinklers is not only not obstructed by anything connected with the valve or other parts adjacent to the sprinkling nozzles, but also that the said force is superinduced by the fact that the diameter of the valve chamber is less than that of the inlet thereinto.

In the accompanying drawings forming part of this specification, in which like numbers of reference denote like parts wherever they occur, Figure 1 is a side elevation showing the position of this device relative to a sprinkling truck;

Fig. 3 is a vertical sectional view taken in a plane running lengthwise of the vehicle and on the line 3—3 in Fig. 4;

Fig. 4 is a top plan view; and

Fig. 5 is a sectional view taken on the line 5—5 in Fig. 3 looking in the direction indicated by the arrows.

Figure 1:
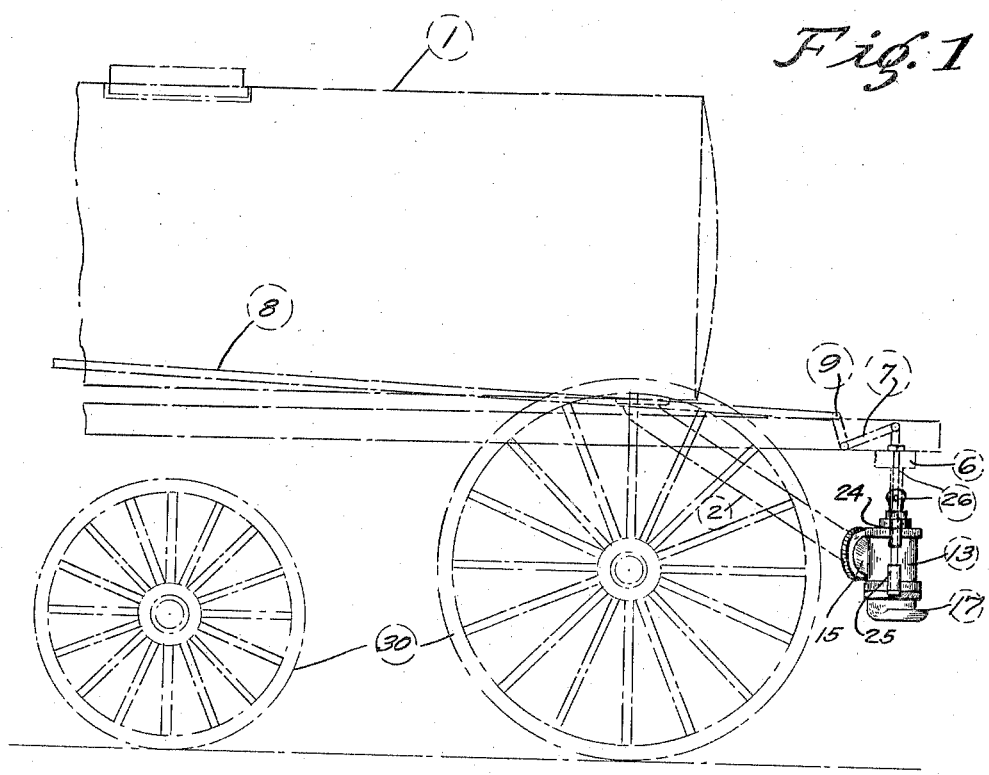

It will be understood that this invention pertains rather to sprinkling trucks than to street flushers and that it represents one of the earliest, if not the earliest, uses of a motor-driven vehicle for that purpose. The greater rapidity of motor-driven apparatus as compared to horse-drawn sprinkling carts introduces new conditions and problems. While advantageous in enabling one vehicle to cover a much larger territory than in the case of a horse-drawn sprinkling cart, the possibility exists of not supplying quickly enough such sufficient flow of water as will adequately sprinkle the streets to lay the dust. Such deficiency is likely to be censured or penalized as a dereliction of duty of the street sprinkler, whether he be a municipal employee or under contract.

The tank 1 may be of any ordinary or desired construction and the water contained therein possesses the usual head. This water flows by gravity through pipes 2 to the devices forming the principal part of this invention, which contain the new valve construction and the sprinkler nozzles that allow the exit of the water to sprinkle the streets.

The said valve is attached by a ball-joint 3 to the stem 4, which is adapted to reciprocate in the sleeve-like cap 5 and cross-piece 6, which together steady its movement. At its outer end one arm of a bellcrank lever 7 is pivoted to the said stem 4 and a rod 8 is pivoted at 9 to the other arm of the said bellcrank lever 7, the said rod leading to and being operable from the driver's seat.

The above-mentioned valve is composed of a pair of plates 10 and 11, between which lies a gasket 12, which gasket is adapted closely to hug the wall of cylinder 13.

The said valve occupies the position shown in Fig. 3, *i. e.*, below the opening 14 out of branch 15 through which flows the water from pipe 2. When in this position the gasket rests upon the top edge of cup 16, which is screwthreaded into the lower part of cylinder 13. This keeps the water from flowing from tank 1 into the cup 16 and escaping through the sprinkler nozzle 17. The nozzle 17 has its bottom formed with an outwardly extending arcuate portion with an upwardly and outwardly inclined or flared flange $17^a$, said nozzle being slotted as at $17^b$ for throwing the water in an upwardly spreading spray as is required for the advantageous delivery of the latter. When the said valve is raised to the upper part of cylinder 13 the water rushes through opening 14 into the cup 16 and adjacent to the nozzle and escapes therethrough for sprinkling purposes. The movement of the said valve from the position shown in Fig. 3 to one allowing the water to flow out of the nozzle 17 is accomplished by the driver pulling on rod 8 and thereby rocking the bellcrank lever 7. He pushes on rod 8 to close the outlet by returning the said valve to the position shown in Fig. 3.

Pipe 2 and branch 15, respectively, are provided with the flanges 18 and 19, which are joined by bolts 20. Branch 15 is preferably cast integral with cylinder 13. Cap 5 is preferably threaded into cylinder 13 at 21. Preferably cup 16 is attached to cylinder 13 by threads 22, as this allows cup 16 to be rotated to any degree desired whereby the nozzle 17 can be pointed in any direction desired, in order that it may emit the most efficient spray. When nozzle 17 has been pointed as desired, it is held stationary by set-screw 23.

Each cylinder 13 is provided with a pair of lugs 24 and a pair of lugs 25 at opposite ends, said lugs having alining openings therethrough for the passage of bolts 26, having heads 27 and nuts 28. Bolts 26 support cylinders 13 from cross-piece 6 and in such manner as not to conflict with the axle 29 or wheels 30. The said cylinders 13 are strongly and steadily supported from cross-piece 6 by bolts 26 so that their weight does not bear upon pipes 2 and so that there is no such movement thereof as to tend to weaken the connection, either of branches 15 with pipes 2 or of pipes 2 with tank 1.

Figure 2:
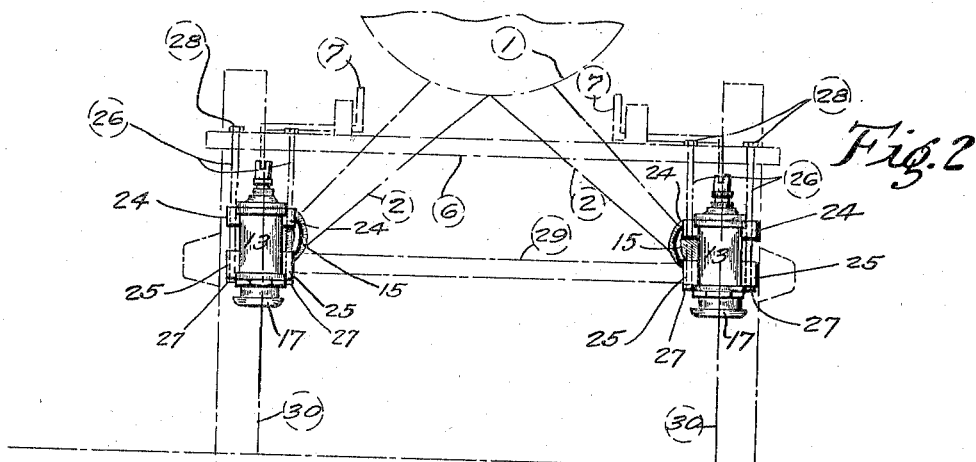
Fig. 2 is a rear elevation showing a pair of these devices in position relative to a sprinkling truck.

Fig. 4 illustrates the lefthand cylinder 13 in Fig. 2. A similar view of the righthand device in Fig. 2 would show the lugs 24 in relatively reversed position as regards their distance from branch 15.

Lugs 31 project downwardly from the underneath side of plate 11, their outer edges 32 slanting in such manner as to serve as a centering device or surface for the purpose of causing the valve truly and neatly to seat in the position shown in Fig. 3. In this way they serve as guides and the ball-joint 3 permits of slight rocking of the valve. The true rectilinear movement of stem 4 is insured by its passage through the sleeve in cap 5 and through cross-piece 6.

Having thus described this invention, I hereby reserve the benefit of all changes in form, arrangement, order, or use of parts, as it is evident that many minor changes may be made therein without departing from the spirit of this invention or the scope of the following claims.

I claim—

1. In a sprinkling apparatus, the combination of a vertically disposed casing, an upwardly inclined tubular extension extending from and communicating with said casing, an adjustably mounted sprinkler inserted in the bottom of the casing and below the point of communication of the hollow extension, the upper edge of the sprinkler forming a valve seat, the lower portion of the sprinkler having a horizontal water outlet adjacent which is formed an upwardly-extending inclined deflector to spread the water, a valve comprising a disk of less diameter than the inner diameter of the casing and operable therein, a packing under the disk, the packing and disk being normally supported on the valve seat, a second disk which is of less diameter than the inner diameter of the sprinkler and which operates in the latter and fits against the packing, the second mentioned disk having depending guide lugs, means for clamping the disks and packing together, a rod extending vertically from the valve and through the casing and connecting means between the inner end of the rod and the top of the valve including means for permitting a slight universal movement of the valve when operated by the rod.

2. A sprinkler comprising a casing formed with an opening in its bottom and provided above the opening with an annular valve seat, an upwardly inclined tubular extension extending from and communicating with the casing above the valve seat, a valve having a flange which extends over the valve seat and flange which fits in the casing inside the valve seat and which is formed with depending lugs to guide the valve in its movement, a rod extending vertically from the valve and through the casing, and a universal connection between the end of the rod and the top of the valve.

In testimony whereof I hereunto affix my signature.

GUSTAV J. STARMANNS.

Copies of this patent may be obtained for five cents each, by addressing the "Commissioner of Patents, Washington, D. C."